(12) United States Patent
Goto

(10) Patent No.: US 11,561,598 B2
(45) Date of Patent: Jan. 24, 2023

(54) POWER SUPPLY DEVICE, POWER SUPPLY SYSTEM, POWER SUPPLY CONTROL METHOD, AND RECORDING MEDIUM

(71) Applicant: Ricoh Company, Ltd., Tokyo (JP)

(72) Inventor: Tomoyuki Goto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/223,064

(22) Filed: Apr. 6, 2021

(65) Prior Publication Data
US 2021/0311539 A1 Oct. 7, 2021

(30) Foreign Application Priority Data

Apr. 7, 2020 (JP) .............................. JP2020-069314
Mar. 29, 2021 (JP) .............................. JP2021-055294

(51) Int. Cl.
*G06F 1/32* (2019.01)
*G06F 1/3231* (2019.01)
*G06F 1/3234* (2019.01)

(52) U.S. Cl.
CPC .......... *G06F 1/3231* (2013.01); *G06F 1/3234* (2013.01)

(58) Field of Classification Search
CPC ........................................................ G06F 1/32
See application file for complete search history.

(56) References Cited

U.S. PATENT DOCUMENTS

| | | | | |
|---|---|---|---|---|
| 5,652,568 | A | * | 7/1997 | Ko ........................ G08B 13/19 340/528 |
| 2006/0181408 | A1 | * | 8/2006 | Martin ................. G08B 25/008 340/528 |
| 2014/0376020 | A1 | | 12/2014 | Imamura |
| 2015/0082067 | A1 | | 3/2015 | Kawano |
| 2017/0034474 | A1 | | 2/2017 | Goto et al. |
| 2017/0127017 | A1 | | 5/2017 | Takahashi et al. |

FOREIGN PATENT DOCUMENTS

| | | |
|---|---|---|
| EP | 3 364 639 A1 | 8/2018 |
| JP | 2013-054320 | 3/2013 |
| JP | 2013-065974 | 4/2013 |
| JP | 2017-027415 | 2/2017 |

OTHER PUBLICATIONS

Extended European Search Report dated Aug. 18, 2021 in European Patent Application No. 21166646.6, 9 pages.

* cited by examiner

*Primary Examiner* — Paul B Yanchus, III
(74) *Attorney, Agent, or Firm* — Xsensus LLP

(57) ABSTRACT

A power supply system includes circuitry that controls transition of an operation mode of the information processing apparatus from a first mode to a second mode in response to reception of user operation for transitioning to the second mode, the second mode being a mode in which electric power supplied to the information processing apparatus is less than that of the first mode, determines whether to release the second mode based on a detection result of a sensor that detects presence of a human, to output a first determination result, determines whether a first condition relating to the user operation is satisfied, to output a second determination result, and determines, based on the second determination result indicating that the first condition is satisfied, whether to allow releasing of the second mode based on the first determination result indicating that no human is detected.

13 Claims, 8 Drawing Sheets

POWER SUPPLY DEVICE, POWER SUPPLY SYSTEM, POWER SUPPLY CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application Nos. 2020-069314, filed on Apr. 7, 2020, and 2021-055294, filed on Mar. 29, 2021, in the Japan Patent Office, the entire disclosure of which is hereby incorporated by reference herein.

BACKGROUND

Technical Field

The present invention relates to a power supply device, a power supply system, a power supply control method, and recording medium.

Related Art

It is known that an apparatus that operates with electric power can operate in a power save mode in which electric power consumption is reduced.

For example, a power supply control device may be provided in such apparatus, which detects presence of a human using a motion sensor. The power supply control device determines whether or not a moving object is detected by the motion sensor. Next, based on a determination that the moving object is detected, the power supply control device causes the apparatus to transition to an awake mode, and starts supplying power to a user interface (UI) touch panel or an IC card reader.

However, none of the known techniques considers a case where the apparatus transitions to the power save mode according to a user operation that requests shifting to the power save mode. For example, when the user finishes using the electronic whiteboard as a meeting ends, the user may input an operation for shifting to the power save mode to request transition to the power save mode. In such a case, after receiving the user input of operation for shifting to the power save mode, a motion sensor may detect the user who is about to leave the electronic whiteboard, and cancel transition to the power save mode based on the detection result. Therefore, even if the power save mode is set according to the user operation, the power save mode may not be maintained.

SUMMARY

In one exemplary aspect, a power supply system includes circuitry that controls transition of an operation mode of the information processing apparatus from a first mode to a second mode in response to reception of user operation for transitioning to the second mode, the second mode being a mode in which electric power supplied to the information processing apparatus is less than that of the first mode. The circuitry determines whether to release the second mode based on a detection result of a sensor that detects presence of a human, to output a first determination result. The circuitry further determines whether a first condition relating to the user operation is satisfied, to output a second determination result. The circuitry determines, based on the second determination result indicating that the first condition is satisfied, whether to allow releasing of the second mode based on the first determination result indicating that no human is detected.

In one exemplary aspect, a power supply device includes a power supply that supplies electric power to an information processing apparatus, and circuitry that controls transition of an operation mode of the information processing apparatus from a first mode to a second mode in response to reception of user operation for transitioning to the second mode, the second mode being a mode in which electric power supplied to the information processing apparatus is less than that of the first mode. The circuitry determines whether to release the second mode based on a detection result of a sensor that detects presence of a human, to output a first determination result. The circuitry further determines whether a first condition relating to the user operation is satisfied, to output a second determination result. The circuitry determines, based on the second determination result indicating that the first condition is satisfied, whether to allow releasing of the second mode based on the first determination result indicating that no human is detected.

In one exemplary aspect, a method for controlling power supply to an information processing apparatus is provided. The method includes: controlling the information processing apparatus to transition from a first mode to a second mode, in response to reception of user operation for transitioning to the second mode, the second mode being a mode in which electric power supplied to the information processing apparatus is less than that of the first mode; determining whether to release the second mode based on a detection result of a sensor that detects presence of a human, to output a first determination result; determining whether a first condition relating to the user operation is satisfied, to output a second determination result; and determining, based on the second determination result indicating that the first condition is satisfied, whether to allow releasing of the second mode based on the first determination result indicating that no human is detected.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
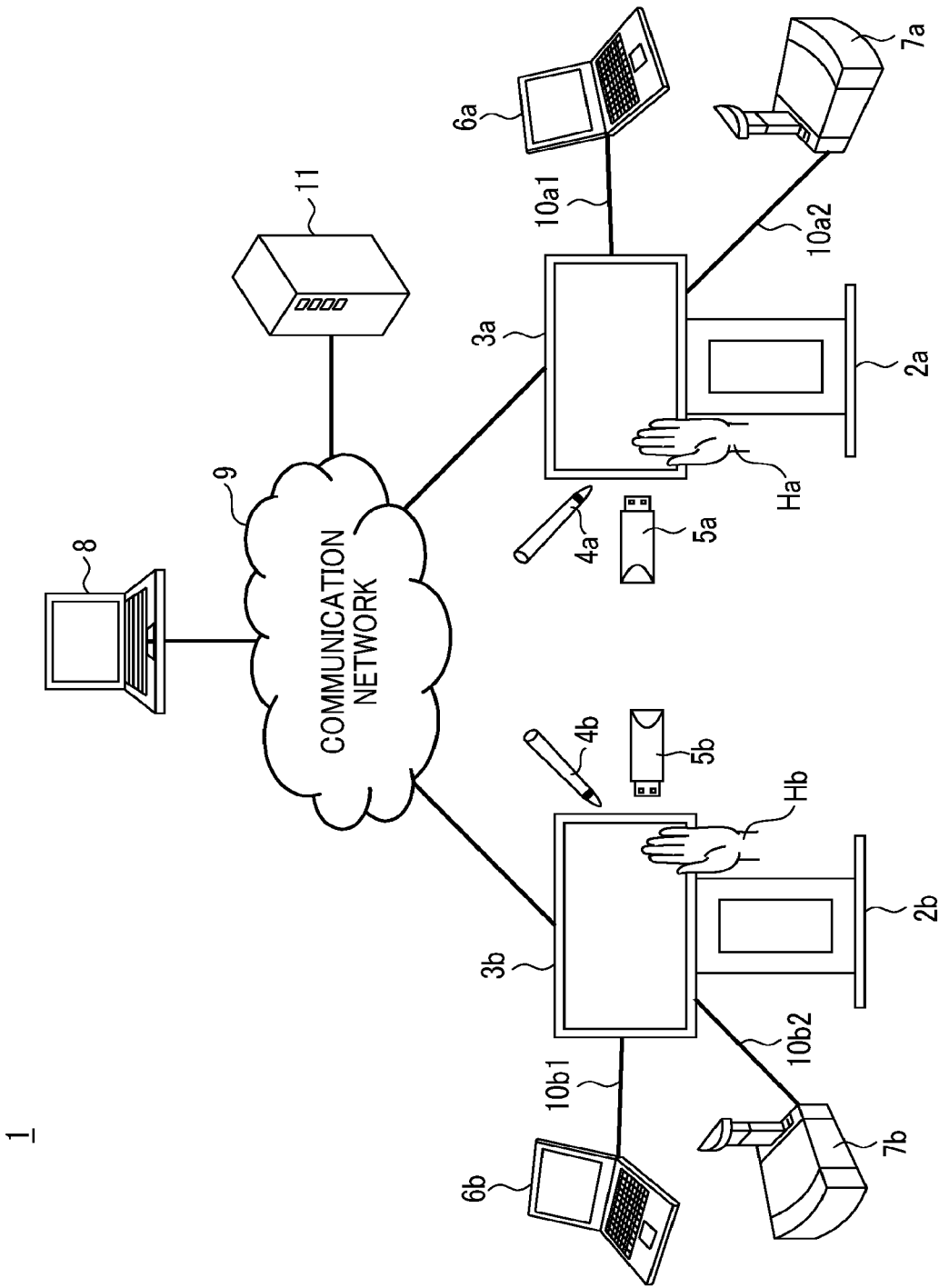
FIG. 1 is a diagram illustrating an example use of an electronic whiteboard, when the electronic whiteboard is provided in an information processing system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Hereinafter, an electronic whiteboard having a power supply device will be described as an example.

FIG. 1 is a diagram illustrating an example application of an electronic whiteboard according to an exemplary embodiment. For simplicity, the following describes an example case in which two electronic whiteboards 2a and 2b, and electronic pens 4a and 4b respectively provided for these electronic whiteboards 2a and 2b are provided. In this embodiment, three or more electronic whiteboards or electronic pens may be used, or one electronic whiteboard may be used.

Referring to FIG. 1, an image processing system 1 includes the electronic whiteboards 2a and 2b, the electronic pens 4a and 4b, universal serial bus (USB) memories 5a and 5b, notebook personal computers (PCs) 6a and 6b, video conference terminals 7a and 7b, and a PC 8. As described below, in this disclosure, the electronic whiteboard 2a and 2b, and the PC 8 are each an example of information processing apparatus.

Further, the electronic whiteboards 2a and 2b and the PC 8 are communicably connected via a communication network 9. The electronic whiteboards 2a and 2b are respectively provided with displays 3a and 3b.

The electronic whiteboard 2a displays an image on the display 3a, which is drawn in response to detection of an event by the electronic pen 4a. The event is, for example, an operation such as touching the display 3a with the tip of the electronic pen 4a or the bottom of the electronic pen 4a.

Further, the electronic whiteboard 2a may change the drawing image being displayed on the display 3a, according to an event (for example, the user's gesture indicating size enlargement, size reduction, or turning pages) made by the user's hand Ha, in alternative to the electronic pen 4a.

The electronic whiteboard 2a is connectable with the USB memory 5a. When connected with the USB memory 5a, the electronic whiteboard 2a reads an electronic file such as a Portable Document Format (PDF) from the USB memory 5a, or stores the electronic file in the USB memory 5a.

The electronic whiteboard 2a is provided with a connector compatible with a standard such as DisplayPort, Digital Visual Interface (DVI), High-Definition Multimedia Interface (HDMI: Registered Trademark), and Video Graphics Array (VGA). Through the connector, the electronic whiteboard 2a is connected with the notebook PC 6a via a cable 10a1.

In response to detection of an event such as contact with the display 3a, the electronic whiteboard 2a transmits event information indicating content of the event to the notebook PC 6a. Similarly, the electronic whiteboard 2a is connected to the video conference terminal 7a (sometimes referred to as a "teleconference terminal") via a cable 10a2 communicable based on a standard, such as the above-described standard.

The notebook PC 6a and the video conference terminal 7a may communicate with the electronic whiteboard 2a by wireless communication compatible with a wireless communication protocol such as BLUETOOTH.

On the other hand, at other site where the electronic whiteboard 2b is provided, similarly to the above-described case of the electronic whiteboard 2a, the electronic whiteboard 2b is provided with the display 3b, the electronic pen 4b, the USB memory 5b, the notebook PC 6b, the video conference terminal 7b, the cable 10b1, and the cable 10b2. Further, the electronic whiteboard 2b changes the image displayed on the display 3b according to an event generated by such as the user's hand Hb or the electronic pen 4b.

The server 11 controls communication between different sites through the communication network 9. For example, the server 11 controls a connection established between the electronic whiteboards 2a and 2b through the communication network 9. At least one of the electronic whiteboards 2a and 2b requests for connection to the server 11, to establish a connection between the electronic whiteboards 2a and 2b. Through controlling connections between different apparatuses or sites through the communication network 9, the server 11 is able to control communication between different apparatuses such as the electronic whiteboards 2, or different sites, through the communication network 9.

As described above, the image drawn on the display 3a of the electronic whiteboard 2a at one site is displayed on the display 3b of the electronic whiteboard 2b at another site. On the other hand, the image drawn on the display 3b of the electronic whiteboard 2b at the another site is displayed on the display 3a of the electronic whiteboard 2a at the one site. In this way, the image processing system 1 enables sharing of the same image between sites that are remotely located. The image processing system 1 is useful when carrying out meetings at remotely located sites.

In the following example, any arbitrary one of the electronic whiteboards 2a and 2b is referred to as the "electronic whiteboard 2".

Similarly, any arbitrary one of the displays 3a and 3b is referred to as the "display 3".

Any arbitrary one of the electronic pens 4a and 4b is referred to as the "electronic pen 4".

Any arbitrary one of the USB memories 5a and 5b is referred to as the "USB memory 5".

Any arbitrary one of the notebook PCs 6a and 6b is referred to as the "notebook PC 6".

Any arbitrary one of the video conference terminals 7a and 7b is referred to as the "video conferencing terminal 7".

Any arbitrary one of the hands Ha and Hb of users is referred to as the "hand H".

Any arbitrary one of the cables 10a1, 10ab, 10b1, and 10b2 is referred to as the "cable 10".

Further, in the following description, an example in which the electronic whiteboard is provided with a power supply device is described. However, an apparatus provided with the power supply device may be any apparatus other than the electronic whiteboard.

For example, the power supply device may be incorporated in an apparatus such as an electronic signage (digital signage), a telestrator used for sports or weather forecasting, or a remote image (video) diagnostic device, each of which is another example of information processing apparatus.

In this disclosure, an example in which the information processing terminal is a notebook PC 6 will be described. However, the information processing terminal is not limited to this example. For example, the information processing terminal may be a terminal capable of supplying an image frame such as a desktop PC, a tablet PC, a portable digital assistant (PDA), a digital video camera, a digital camera, or a game machine.

The communication network 9 includes the Internet, a Local Area Network LAN (LAN), a mobile phone communication network, for example. In order to enhance security, the communication network 9 may be connected to the Internet using a Virtual Private Network (VPN).

In the following description, an example in which the recording medium is a USB memory is described. However, the recording medium is not limited to this example. For example, the recording medium may be another type of recording medium such as a secure digital (SD: Registered Trademark) memory card.

In this description, an image representing characters, figures, numbers, symbols, lines or a combination thereof that the user writes by hand on the electronic whiteboard is called a "stroke image".

Example hardware configuration of electronic whiteboard:

Hereinafter, an example hardware configuration of the electronic whiteboard is described according to the present embodiment.

Figure 2:
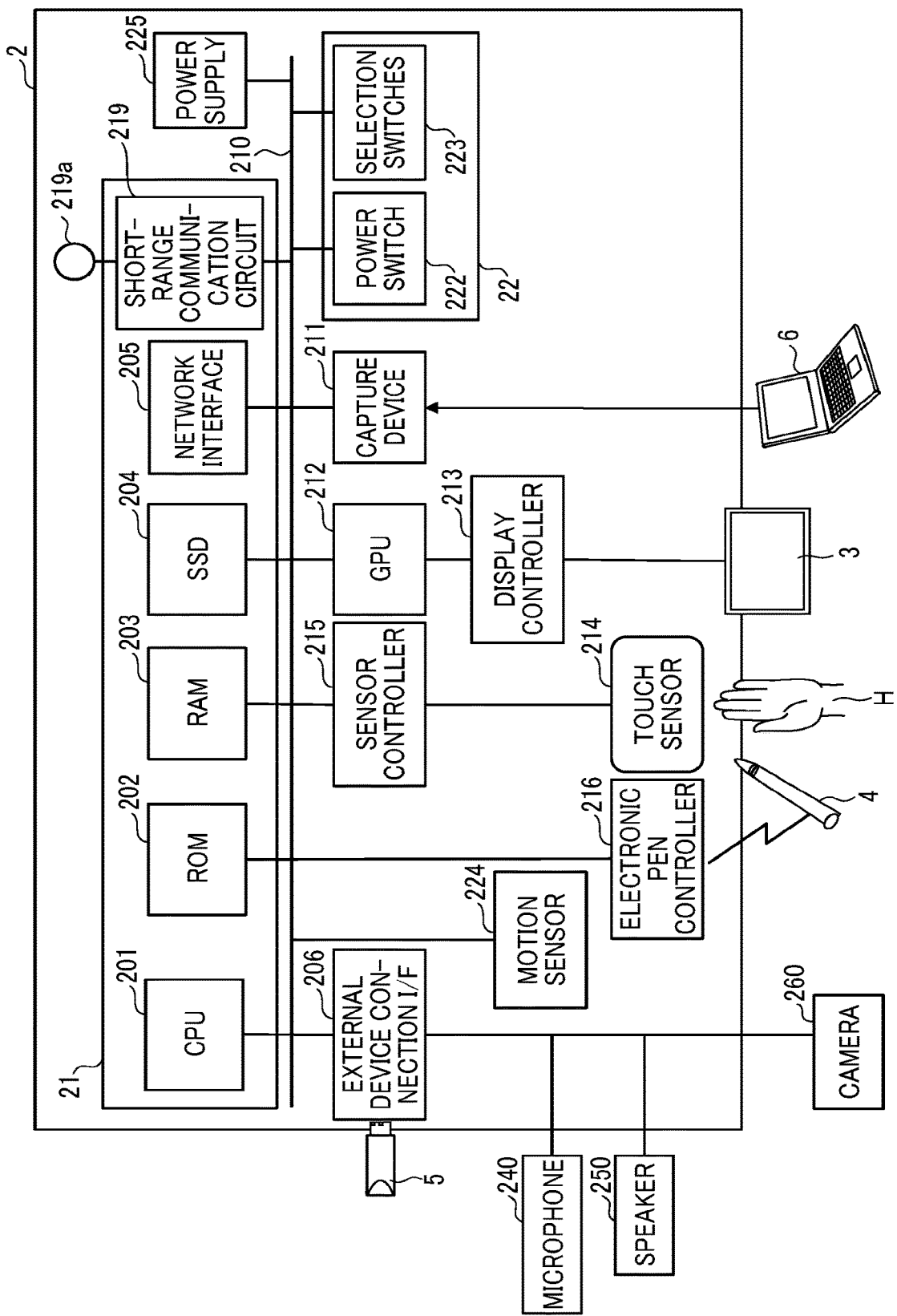
FIG. 2 is a diagram illustrating a hardware configuration of the electronic whiteboard according to an embodiment.

FIG. 2 is a schematic block diagram illustrating a hardware configuration of the electronic whiteboard, according to the embodiment.

The electronic whiteboard 2 includes a Central Processing Unit (CPU, hereinafter referred to as "CPU 201"), which controls entire operation of the electronic whiteboard 2.

The electronic whiteboard 2 further includes a Read-Only Memory (ROM, hereinafter referred to as "ROM 202"), which stores a program used for driving a CPU 201 such as an Initial Program Loader (IPL).

The electronic whiteboard 2 includes as a Random Access Memory (RAM, hereinafter referred to as "RAM 203") used as a work area for the CPU 201.

The electronic whiteboard 2 includes a Solid State Drive (SSD, hereinafter referred to as "SSD 204"), which stores various data such as a program for the electronic whiteboard 2.

The electronic whiteboard 2 includes a network interface (hereinafter referred to as "network I/F") 205 that controls communication via the communication network 9, and an external device connection interface (hereinafter referred to as "external device connection I/F") 206 that controls communication with an external device. Examples of the external device include the USB memory 5, a microphone 240, a speaker 250, and a camera 260.

The electronic whiteboard 2 further includes a capture device 211, a graphics processing unit (GPU) 212, a display controller 213, a contact sensor 214, a sensor controller 215, an electronic pen controller 216, a short-range communication circuit 219, a power switch 222, selection switches 223, a motion sensor 224, and a power supply 225. The capture device 211 displays video information as a still image or a video image on a display of the notebook PC 6.

The GPU 212 is a semiconductor chip dedicated to graphics.

The display controller 213 controls display of an image processed at the GPU 212 for output through the display 3 provided with the electronic whiteboard 2.

The contact sensor 214 detects that the electronic pen 4, the hand H, or the like has come into contact with the display 3.

The sensor controller 215 controls processing performed by the contact sensor 214. Specifically, the contact sensor 214 senses a touch input to a specific coordinate on the display 3 using the infrared blocking system. To input coordinates and detect such coordinates, two light receiving elements, disposed on both upper side ends of the display 3, emit a plurality of infrared rays in parallel to a surface of the display 3. Then, the emitted infrared rays are reflected by a reflector frame provided surrounding the sides of the display 3. The light receiving elements receive lights passing in the direction that is the same as an optical path of the emitted infrared rays, which are reflected by the reflector frame.

The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object.

The electronic pen controller 216 communicates with the electronic pen 4 to detect a touch by the tip or bottom of the electronic pen 4 with respect to the display 3.

The short-range communication circuit 219 communicates data via an antenna 219a in compliance with such as Near Field Communication (NFC) or BLUETOOTH.

The power switch 222 turns on or off the power of the electronic whiteboard 2.

The selection switches 223 are a group of switches such as switches for adjusting brightness, hue, etc., of a display image on the display 3.

The electronic whiteboard 2 further includes a bus line 210. The bus line 210 is an address bus, a data bus, or the like for electrically connecting each component such as the CPU 201.

The system that the contact sensor 214 applies is not limited to the infrared blocking system. For example, the contact sensor 214 may use a capacitance touch panel that identifies a contact position by detecting a change in capacitance. Further, the contact sensor 214 may use a resistance film touch panel that specifies a contact position by a change in voltage of two opposing resistance films. Alternatively, the contact sensor 214 may use an electromagnetic induction touch panel, for example, which detects electromagnetic induction caused by contact of an object to a display to specify the contact position.

In addition or in alternative to detecting a touch by the tip or bottom of the electronic pen 4, the electronic pen controller 216 may also detect a touch by another part of the electronic pen 4, such as a part held by a hand of the user.

The motion sensor 224 is a sensor that detects the presence or absence of a person. For example, the motion sensor 224 detects a person using infrared rays. That is, infrared rays are emitted depending on the temperature of a human (person) or animal. The motion sensor 224 detects a person by sensing infrared rays emitted by the person.

The system that the motion sensor 224 applies is not limited to the infrared-based system. For example, the motion sensor 224 may detect whether or not there is a person in the image taken by such as the camera using the face recognition technology, to determine presence or absence of the person. Alternatively, the motion sensor 224 may detect a person by sound, temperature, vibration, acquisition of a detection result from an external device, or a combination thereof.

The power supply 225 supplies electric power to each component of the electronic whiteboard 2. The power supply 225 changes the power supply destination, the amount of power to be supplied, etc., under control of the CPU 201 such as control to switch a mode such as the power save mode.

Hereinafter, a device provided with the CPU 201, ROM 202, RAM 203, SSD 204, network I/F 205, and short-range communication circuit 219 will be referred to as a "controller 21".

The controller 21 may be removable from the electronic whiteboard 2. Further, the controller 21 may be set so as not to be controlled by a button or the like. For example, the controller 21 is a computing (control) module that is compatible with Open Pluggable Specification (OPS). In this disclosure, a control module and slot dedicated to digital signage is used. The configuration of the controller 21 is not limited to the configuration illustrated in FIG. 2. As long as the controller 21 has a CPU, a memory as a storage area, and various interfaces, the controller 21 may have a configuration other than the configuration illustrated in FIG. 2. The CPU implements various functions of the electronic whiteboard 2, by executing the OS (Operating System) and the application program stored in the memory.

The power switch 222 and the selection switches 223 are collectively referred to as a "main body key 22". In the following, it is assumed that, in response to user operation of pressing a button on the main body key 22 (referred to as operation for shifting to the power save mode), the power save mode is set under control of the controller 21.

However, a trigger for setting the power save mode is not limited to operation input via the main body key 22. That is, trigger for setting the power save mode may be operation received via, for example, a remote controller or another external device, regardless of hardware used for such operation.

Figure 3:
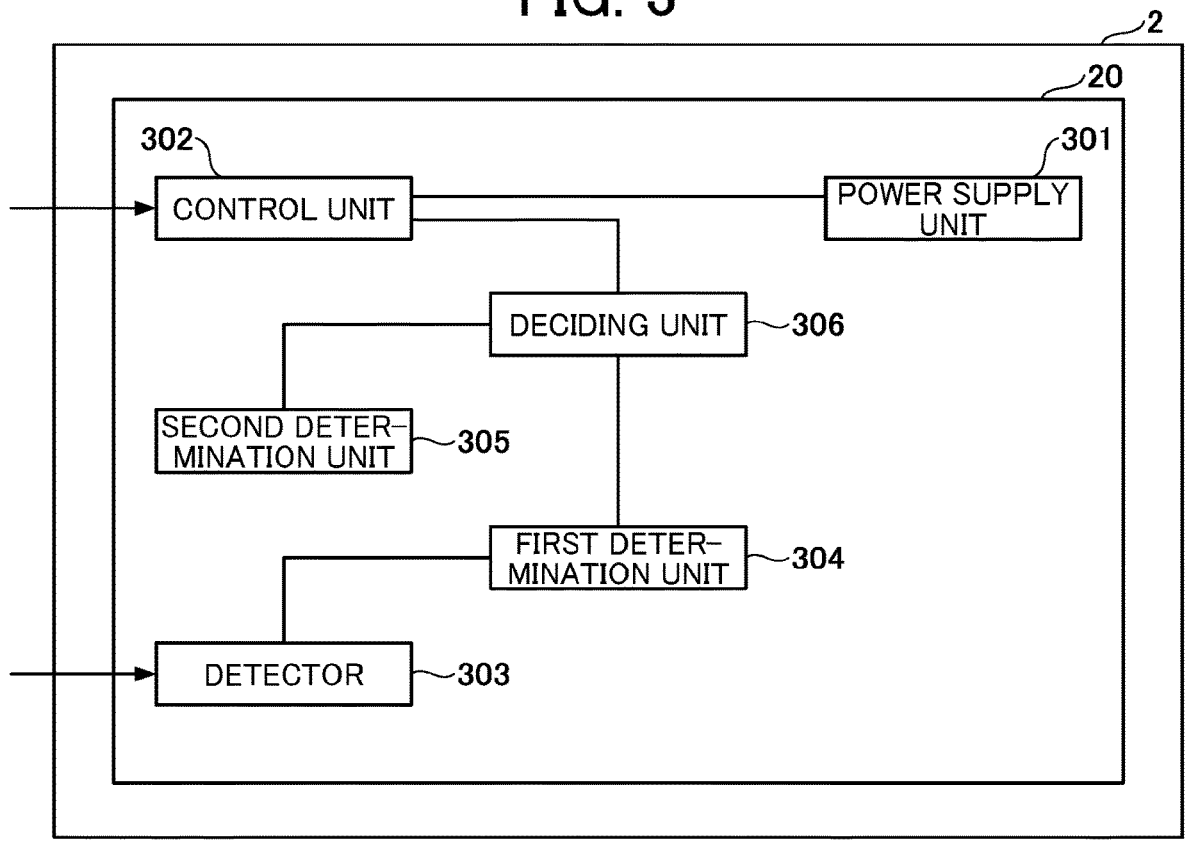
FIG. 3 is a diagram illustrating a functional configuration of the electronic whiteboard, as an example of a power supply system, according to an embodiment.

Example Functional Configuration:

FIG. 3 is a diagram illustrating an example functional configuration of the electronic whiteboard 2. For example, the electronic whiteboard 2 includes, as a functional configuration, a power supply unit 301, a control unit 302, a detection unit 303, a first determination unit 304, a second determination unit 305, and a deciding unit 306.

The power supply unit 301 is implemented by, for example, the power supply 225. The control unit 302, the first determination unit 304, the second determination unit 305, and the deciding unit 306 are implemented by the controller 21. The detection unit 303 is implemented by the motion sensor 224.

In FIG. 3, the power supply system is implemented by the electronic whiteboard 2, in which the power supply device 20 is incorporated therein. That is, the electronic whiteboard 2 has a function of the information processing apparatus and a function of the power supply device 20. However, the power supply system is not limited to this example illustrated in FIG. 3. For example, the power supply system may be implemented by the electronic whiteboard 2 that operates as the information processing apparatus, and the power supply device 20 provided external to the electronic whiteboard 2.

In such case, the power supply 255 (FIG. 2), which function as the power supply unit 301, may be provided external to the electronic whiteboard 2. The power supply unit 301 includes a control board (other example of the controller 21), which functions as the control unit 302, the first determination unit 304, the second determination unit 305, and the deciding unit 306. Further, the detection unit 303 is implemented by the motion sensor 224 (FIG. 2), which may be provided external to the electronic whiteboard 2. For example, the detection unit 303 may be any one or more sensors provided in the room where the electronic whiteboard 2 is provided. The control board may be divided into a plurality of sections (such as circuits) that respectively correspond to the control unit 302, first determination unit 304, second determination unit 305, and deciding unit 306. The respective sections may be connected through any known wired or wireless interface. In such case, for example, the electronic whiteboard 2 and the power supply device 20 may be connected to each other through a wired or wireless interface circuit, such that the electronic whiteboard 2 and the power supply device 20 are communicable with each other.

Alternatively, the control unit 302, the first determination unit 304, the second determination unit 305, and the deciding unit 306 may be implemented by one or more servers (computers) on cloud. In such case, one or more servers may implement functions of one or more of the control unit 302, the first determination unit 304, the second determination unit 305, and the deciding unit 306.

Figure 4:
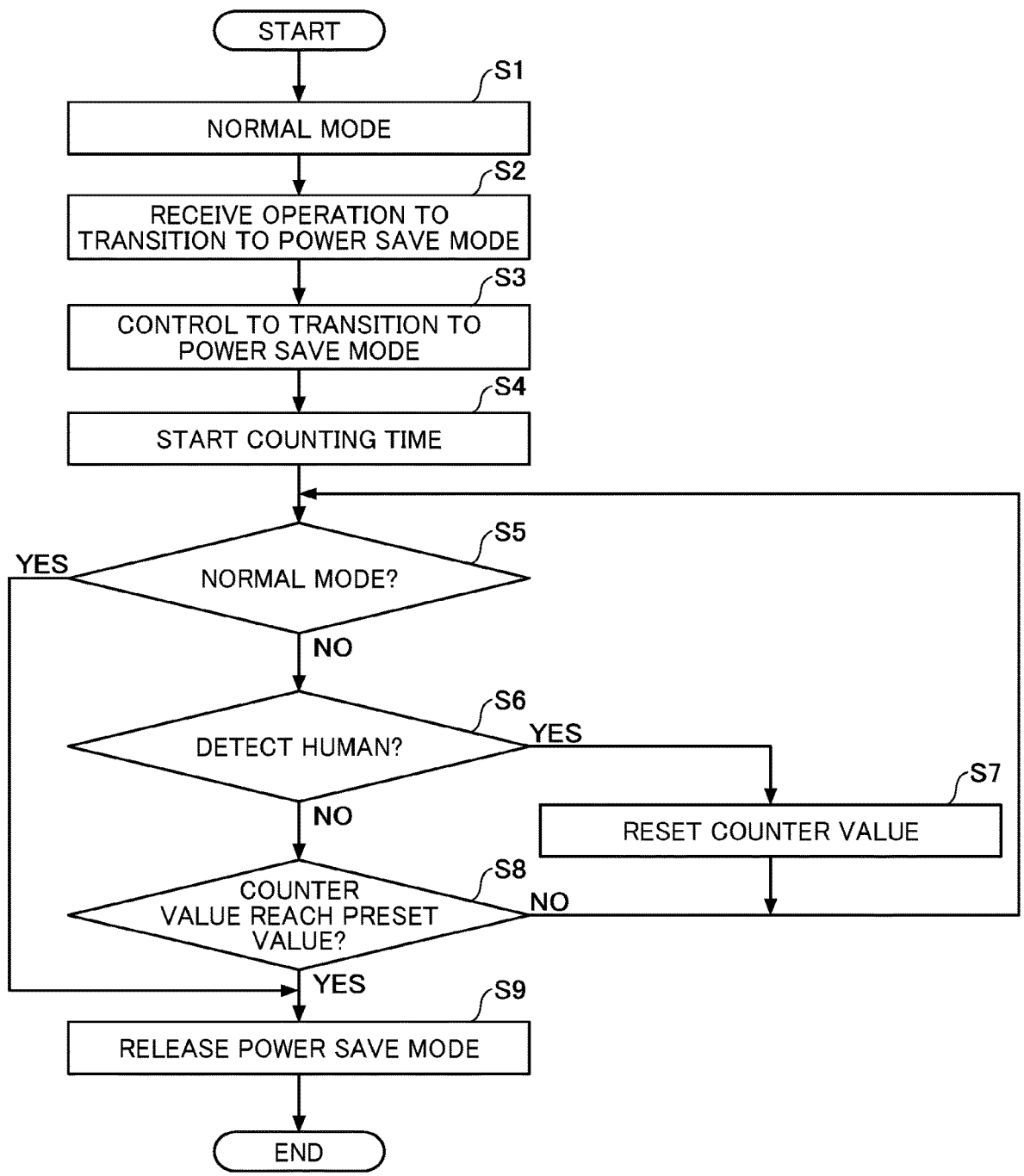
FIG. 4 is a flowchart illustrating operation performed by the electronic whiteboard of FIG. 3, according to an embodiment.

Example Processing:

FIG. 4 is a diagram illustrating an example of processing performed by the electronic whiteboard, according to an embodiment. In the following, an operation state of the electronic whiteboard 2 in which the display 3 can be used is referred to as a "normal mode". That is, the normal mode is a mode in which more power is consumed than power consumed in the power save mode. For example, in the normal mode, power is supplied to a device such as the display 3. In this description, the power save mode and the normal mode are not determined only based on availability of the display 3. That is, the power save mode is a state in which less power is consumed compared to power consumed in the normal mode. Therefore, any device may be used as the device in which the power is cut off or the power supply is reduced in the power save mode.

(Example of Setting the Normal Mode)

At S1, the control unit 302 shifts the operation mode of the electronic whiteboard 2 from the power save mode to the normal mode. In alternative to switching from the power save mode, the user may turn on the power of the electronic whiteboard 2. For example, the normal mode is set when the person (user) starts using the electronic whiteboard 2 at a meeting or the like.

(Example of Input Operation to Shift to Power Save Mode)

At S2, in response to a user input, the control unit 302 inputs an operation to shift the operation mode of the electronic whiteboard 2 from the normal mode to power save mode. For example, when the user (hereinafter sometimes referred to as an "operator") operates an interface such as a button (in this example, the main body key 22) or an icon to turn the display 3 "OFF", the control unit 302 inputs the operation for shifting the operation mode to the power save mode. The control unit 302 then proceeds the operation to S3 in response to such input operation as a trigger.

(Example of Control Operation to Shift to Power Save Mode)

At S3, the control unit 302 controls transition to the power save mode, according to the user input. Specifically, the control unit 302 shifts the operation mode of the electronic whiteboard 2 from the normal mode to the power save mode. In the power save mode, under control of the control unit 302, the power supply unit 301 reduces the power supplied to the electronic whiteboard 2, for example, by cutting off power supplied to a preset device such as the display 3.

(Example of Starting Counting Elapsed Time)

Processing of S4 is described below. In the following, a determination result of determining whether or not to switch to the power save mode based on the detection result of a person, which is determined by the first determination unit 304, is referred to as "first determination result".

Further, a condition set in advance as a condition for enabling or disabling releasing of the power save mode is called a "first condition". The result of determining whether or not the first condition is satisfied is referred to as a "second determination result", which is determined by the second determination unit 305.

The first condition is a condition related to operation by the operator. Desirably, the first condition is a condition in which an elapsed time, counted from the time when transition is made to the power save mode in response to the user operation, reaches a preset value. Hereinafter, a case where the first condition is set in advance as "whether a predetermined time has passed (elapsed) since the transition to the power save mode" is described as an example.

The second determination unit 305 starts counting an elapsed time to obtain a counter value. That is, the elapsed time is counted by a timer (of the CPU 201) in response to execution of S3 as a trigger.

(Example of Mode Determination)

At S5, the control unit 302 determines the operation mode of the electronic whiteboard 2. It is desirable that the mode is determined as follows. For example, as illustrated in FIG. 4, the control unit 302 determines whether the current mode is the normal mode. When it is determined that the current mode is the normal mode (YES at S5), the control unit 302 proceeds the operation to S9. After the user input for shifting from the normal mode to the power save mode is received at S3, the electronic whiteboard 2 may not always transition to the power save mode immediately, for example, if the user is still operating the electronic whiteboard 2. In such case, operation proceeds to S9, to cause the electronic whiteboard 9 to continue to operate in the normal mode, without performing S6, S7, and S8. In such case, at S9, the power save mode is released, such that the operation mode can be transitioned to the normal mode.

On the other hand, when it is determined that the current mode is not in the normal mode (NO at S5), the control unit 302 proceeds the operation to S6.

(Example of Determining Whether or not a Person has been Detected)

After the operation mode is transitioned to the power save mode, at S5, the first determination unit 304 outputs the first determination result of determining whether or not the detection unit 303 has detected a person. When it is determined that the person is detected based on the detection result (YES at S6), the first determination unit 304 proceeds the operation to S7. On the other hand, when it is determined that no person is detected based on the detection result (NO at S5), the first determination unit 304 proceeds the operation to S8.

(Example of Resetting the Elapsed Time)

At S7, the second determination unit 305 resets a counter value of the elapsed time, and the operation returns to S5.

(Example of Determining Whether or not the Elapsed Time has Elapsed)

At S8, the second determination unit 305 determines whether or not the elapsed time has reached the preset value, and outputs the second determination result.

Next, when the second determination result indicates that the elapsed time from the transition to the power save mode has reached the preset value (YES at S8), the second determination unit 305 proceeds the operation to S9. On the other hand, when the second determination result indicates that the elapsed time from the transition to the power save mode has not reached the preset value (NO at S8), the second determination unit 305 proceeds the operation to S5.

When the person has been detected (YES at S6), the operation proceeds to S7, and the elapsed time is reset at S7, and the operation proceeds further to S5. That is, even after the user has input the operation for shifting to the power save mode, it may take for the user some time before leaving the electronic whiteboard 2. In view of this, the elapsed time is reset based on detection of the user.

Accordingly, the elapsed time is counted, after transition from the normal mode to the power save mode in response to the user operation for shifting to the power save mode, and after the time no human is detected. Further, when the elapsed time reaches the preset time, releasing to the power save mode is made valid.

(Example of Determining to Validate Releasing of the Power Save Mode)

At S9, the deciding unit 306 determines to validate releasing of the power save mode. When the above-mentioned processing is performed, for example, the following processing result is obtained.

Figure 5:
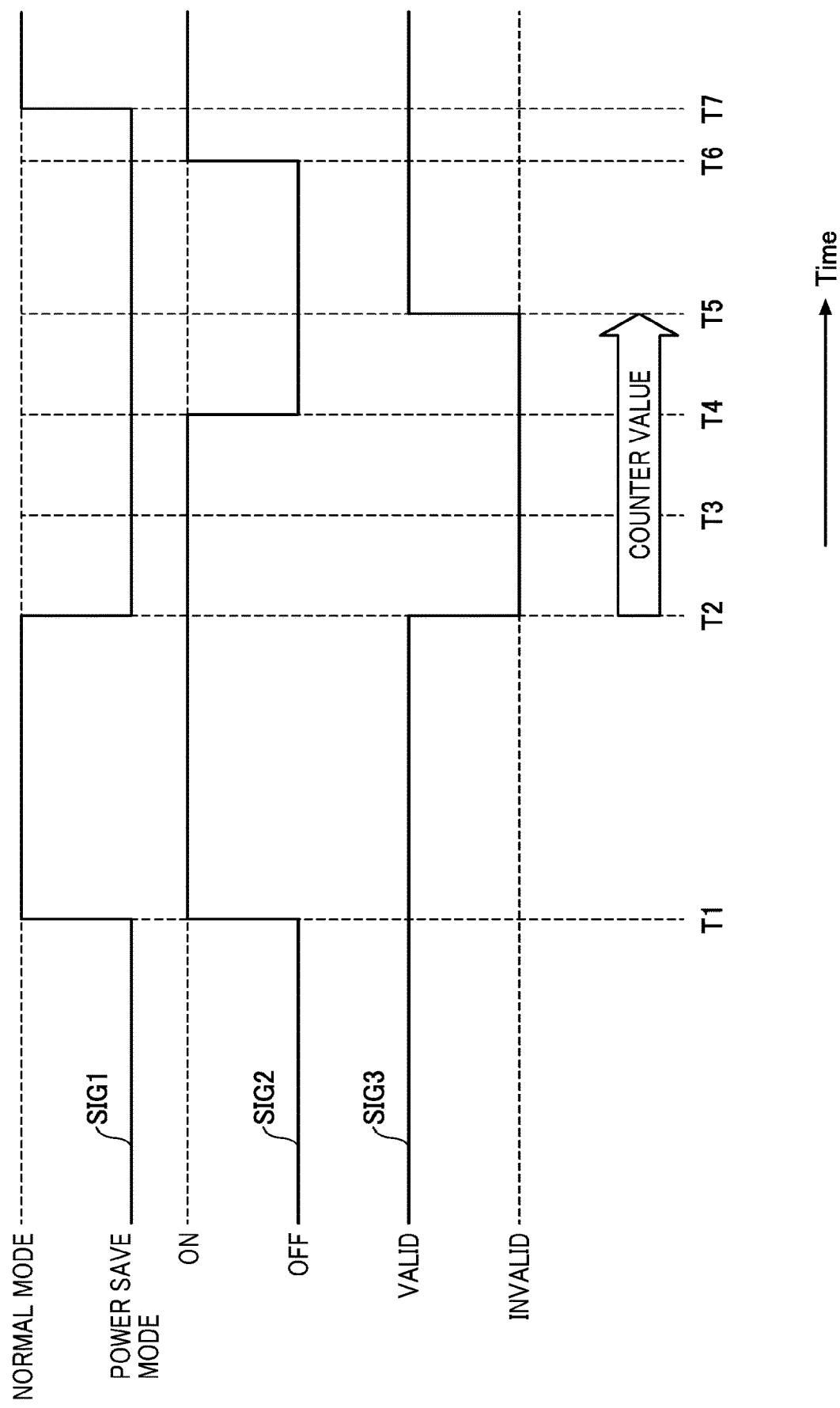
FIG. 5 is a diagram illustrating an example of processing result of the operation of FIG. 4, according to a first embodiment.

FIG. 5 is a diagram illustrating an example of processing result. Table 1 illustrates the example of processing result, which corresponds to FIG. 5.

TABLE 1

| TIMING | EVENT | MODE SWITCH SIGNAL (SIG1) | DETECTION SIGNAL (SIG2) | VALID SIGNAL (SIG3) |
| --- | --- | --- | --- | --- |
| FIRST TIMING T1 | USER ENTERS ROOM | NORMAL MODE | ON | VALID |
| SECOND TIMING T2 | USER OPERATION FOR SHIFTING TO POWER SAVE MODE | POWER SAVE MODE | ON | INVALID |
| THIRD TIMING T3 | DETECTS USER | POWER SAVE MODE | ON | INVALID |
| FOURTH TIMING T4 | USER LEAVES ROOM | POWER SAVE MODE | OFF | INVALID |
| FIFTH TIMING T5 | ELASPED TIME REACHES PRESET VALUE | POWER SAVE MODE | OFF | VALID |
| SIXTH TIMING T6 | ANOTHER USER ENTERS ROOM | POWER SAVE MODE | ON | VALID |
| SEVENTH TIMING T7 | RELEASE POWER SAVE MODE | NORMAL MODE | ON | VALID |

The first to seventh timings T1 to T7 in Table 1 correspond to the timings T1 to T7 in the timing chart in FIG. 5, respectively. In the example illustrated in FIG. 5, the "event" in Table 1 indicates a specific event that occurs at corresponding one of the first timing T1 to the seventh timing T7. Hereinafter, each event that occurs at each timing will be described. Further, in the example illustrated in FIG. 5, a mode of the electronic whiteboard 2 is switched according to a mode switching signal SIG1. When the mode switching signal SIG1 is "High", the "normal mode" is set. On the other hand, when the mode switching signal SIG1 is "Low", the "power save mode" is set. In Table 1, a value in the "mode switching signal" field represents the mode set according to the mode switching signal SIG1. The mode switching signal is output by the control unit 302.

Further, a detection signal SIG2 indicates a detection result by the detection unit 303. In this example, when the detection signal SIG2 is "ON", the detection result indicates that a person is detected. On the other hand, when the detection signal SIG2 is "OFF", the detection result indicates that no person is detected. In Table 1, a value in the "detection signal" field represents the detection result.

Further, a valid signal SIG3 is a signal indicating whether switching of the operation mode to release the power save mode is made "valid" or "invalid" based on the detection result. In Table 1 and the timing chart of FIG. 5, determination of whether the valid signal SIG3 is "valid" or "invalid" is an example of the second determination result of whether or not the first condition is satisfied, which is determined by the second determination unit 305. That is, when the valid signal SIG3 is invalid, transition to the power save mode is not allowed. When the valid signal SIG3 is valid, transition to the power save mode is allowed.

At the first timing T1, the detection signal SIG2 is switched from "OFF" to "ON" based on a detection of the user (that is, a person) entering the room. That is, the user is detected by the detection unit 303. At the first timing T1, the valid signal SIG3 is "valid". The control unit 302 controls the electronic whiteboard 2 to transition from the power save mode to the normal mode. In the normal mode, the user holds such as a meeting using the electronic whiteboard 2 after the first timing T1.

At the second timing T2, in response to a user input, the control unit 302 inputs operation for shifting to the power save mode. The control unit 302 outputs the mode switching signal SIG1 that is high, to cause the electronic whiteboard 2 to transition from the "normal mode" to the "power save mode". For example, the second timing T2 is the timing at which the user input is received as the meeting ends. Then, at the second timing T2, the valid signal SIG3 is switched from "valid" to "invalid" in conjunction with the switching of the mode switching signal SIG1.

Further, the second determination unit 305 starts counting the elapsed time from the second timing T2, as the start point. In this example, the elapsed time between the second timing T2 and the fifth timing T5 is a time in which the counter value of the elapsed time has not reached the preset value, such that the first condition is not satisfied. Therefore, the valid signal SIG3 remains "invalid" between the second timing T2 and the fifth timing T5. As described above, when the valid signal SIG3 is "invalid", the deciding unit 306 determines to invalidate the releasing of the power save mode. When the valid signal SIG3 is "invalid", the mode switching signal SIG1 is not switched from the "power save mode" to the "normal mode", as in the first timing T1, even if the user (person) is detected.

At the third timing T3, the detection unit 303 detects the user (person). The third timing T3 is an example of a time point when the elapsed time has not passed much from the second timing T2. At the third timing T3, the user who has input the operation at the second timing T2 may be still nearby. At the third timing T3, assuming that the user who has input the operation is detected by the detection unit 303, the detection signal SIG2 is "ON".

On the other hand, at the third timing T3, the valid signal SIG3 is "invalid". Even if the user is detected, releasing of the power save mode is invalid. Therefore, the electronic whiteboard 2 still operates in the power save mode.

It is assumed that the user detected at the third timing T3 is not a user who will use the electronic whiteboard 2 from now on, but a user who has finished using the electronic whiteboard 2. If the power save mode is released based on the detection result of detecting such user, the user has to operate the electronic whiteboard 2 again to request transition to the power save mode.

If the power save mode is released based on detection of the user, the power save mode may be switched to the normal mode again during a time period until the time when the user leaves the room, even if the operation to transition to the power save mode is input by such user. That is, the power save mode, which has been set according to user operation, is not maintained.

In contrary, if the valid signal SIG3 is used, the power save mode, which has been set according to user operation, is maintained during a time period between the second timing T2 and the fifth timing T5. Accordingly, when a determination is made based on the elapsed time, releasing of the power save mode is invalidated at least for a time period when the user who inputs operation for shifting to the power save mode is detected. This prevents releasing of the power save mode and returning to the normal mode when it is undesired.

In particular, there is a case in which an interface (for example, a power switch or a shutdown button, which may be provided as the main body key 22) that allows the user to input operation for shifting to the power save mode is provided within a range that the motion sensor 224 can detect a person. In some cases, the motion sensor 224 may detect any person, who is on a route, from the position where the operation for shifting to the power saving mode is input, to an exist of a room. In such a case, even if the user inputs operation for shifting the power save mode, the power save mode may be released before the user leaves the room, such that the power save mode is not maintained.

In other words, to maintain the power save mode, the user who has input operation for shifting the power save mode cannot leave the electronic whiteboard 2. This means that it is not possible to set the power save mode according to the user operation, and keeps such mode until the time when the next user starts using the electronic whiteboard 2. With use of the valid signal SIG3, the power save mode, which is set according to the user operation, is maintained.

At the fourth timing T4, the user leaves the room. The detection unit 303 does not detect the user from the fourth timing T4. Therefore, the detection signal SIG2 is "OFF" from the fourth timing T4 until the next user is detected (in this example, until the sixth timing T6). For a time period when the detection signal SIG2 is "OFF" (in this example, the fourth timing T4 to the sixth timing T6), the power save mode is maintained.

The fifth timing T5 is a timing at which the counter value of the elapsed time reaches the preset value. That is, at the fifth timing T5, the second determination unit 305 determines that the first condition is satisfied. At the fifth timing T5, the second determination unit 305 switches the valid signal SIG3 from "invalid" to "valid". After the fifth timing T5, the deciding unit 306 determines that releasing of the power save mode is made valid.

At the sixth timing T6, the detection unit 303 detects a user. At the sixth timing T6, it is assumed that the detection unit 303 detects the user, who will use the electronic whiteboard 2 next, as the user enters the room.

Then, at the sixth timing T6, the second determination unit 305 switches the valid signal SIG3 to "valid". The control unit 302 controls the electronic whiteboard 2 to transition from the power save mode to the normal mode. Based on such control, in this example, the operation mode of the electronic whiteboard 2 is switched from the "power save mode" to the "normal mode" at the seventh timing T7. In this example, due to the time required for processing, there may be a time lag from the detection of a person (the sixth timing T6) to the switching of the mode (the seventh timing T7).

At the seventh timing T7, the control unit 302 switches the mode switching signal SIG1 from the "power save mode" to the "normal mode". Because the power save mode is released based on a detection of the user who will use the electronic whiteboard 2, the user can quickly use the electronic whiteboard 2 without requiring a user input for shifting to the normal mode.

During when the above-mentioned processing is performed, the operation mode changes as follows, for example.

Figure 6:
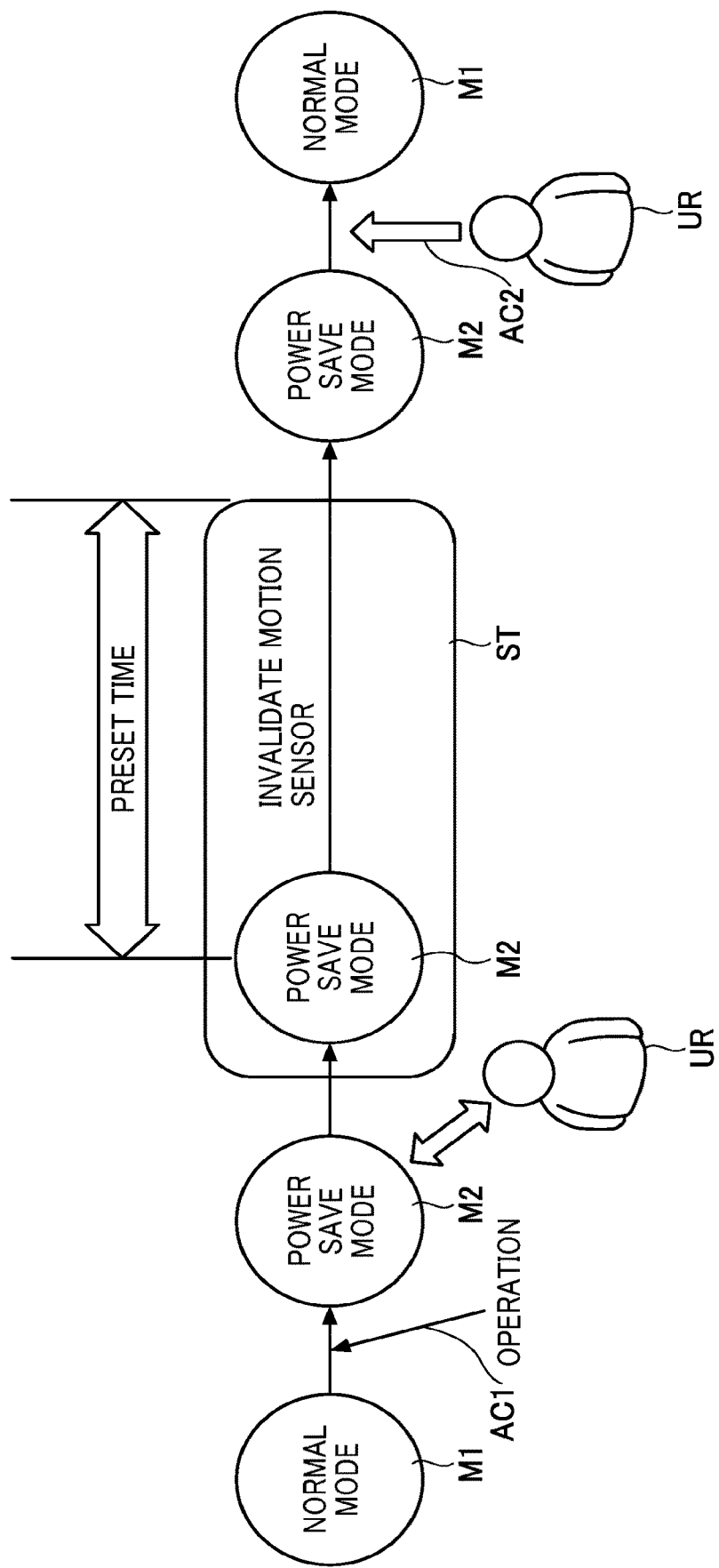
FIG. 6 is a diagram illustrating example of transition of modes, according to the first embodiment.

FIG. 6 is a diagram illustrating example of transition of modes.

As illustrated in FIG. 6, when the electronic whiteboard 2 is used such as in a meeting, the electronic whiteboard 2 is in the normal mode M1. When the meeting finishes, the user UR inputs an operation for shifting to the power save mode (hereinafter, simply referred to as "operation AC1").

In response to input of the operation AC1, the operation mode of the electronic whiteboard 2 transitions from the normal mode M1 to the power save mode M2. In the power save mode M2, the power consumed by the electronic whiteboard 2 is reduced as compared with the normal mode M1, as a preset device such as the display 3 is turned off.

In this example, the operation AC1 is performed by the user UR touching the main body key 22 of the electronic whiteboard 2 or the icon displayed by the display 3. Therefore, immediately after the operation AC1 is input, the user UR who has input the operation AC1 is near the electronic whiteboard 2. The user UR at such a position is likely to be detected by the motion sensor 224.

In order to maintain the power save mode M2, at the electronic whiteboard 2, the control unit 302 sets the motion sensor 224 in an invalid state (hereinafter referred to as "invalid state ST") for a preset time period.

In the invalid state ST, the power save mode M2 is maintained regardless of the detection result of the motion sensor 224. Therefore, in the invalid state ST, the operation mode does not transition to the normal mode M1 and the power save mode M2 is maintained even when the user UR is present. If such an invalid state ST cannot be set, the detection unit 303 may detect the user UR who has input the operation AC1 as the user UR leaves the electronic whiteboard 2. Based on the detection result, the control unit 302 shifts the operation mode to the normal mode M1 again. Therefore, the user UR cannot leave the electronic whiteboard 2, if the user wants to keep the power save mode M2. As long as the motion sensor 224 keeps in the invalid state ST for the preset time period, the power save mode M2 can be maintained.

Then, when the elapsed time, counted from the invalid state ST, has reached the preset value, at the electronic whiteboard 2, the motion sensor 224 is no longer in the invalid state ST. After the invalid state ST is changed to the valid state, when another user UR approaches (hereinafter referred to as "approaching action AC2"), the detection unit 303 (or motion sensor 224) detects the another user UR, and the operation mode transitions to the normal mode M1. The approaching action AC2 may be an act other than approaching the electronic whiteboard 2, as long as it is operation that can be detected. If the power save mode M2 can be maintained until the approaching action AC2 is detected, the power consumed during standby can be reduced. Then, when the mode transitions to the normal mode M1 in response to detection of the approaching action AC2 as a trigger, the another user UR, who will use the electronic whiteboard 2 next, can quickly use the electronic whiteboard 2.

In most cases, the user UR, who finishes using the electronic whiteboard 2, is not nearby when sufficient time has passed, that is, when the elapsed time has reached the preset value. By enabling to set the invalid state ST (that is, whether to validate or invalidate detection of the motion sensor 224) according to the value of the elapsed time, it becomes possible to prevent the user UR that has input the operation AC1 from being detected, thus preventing unwanted releasing of the power save mode M2.

The first condition used for determining whether or not to set the invalid state ST does not have to be determined only based on whether the elapsed time has reached the preset value. For example, if only the elapsed time is used to make determination, if the user UR who has input the operation AC1 stays near the electronic whiteboard 2 for a long time period, the operation mode may transition to the normal mode M1 again even though the user UR is present. In view of this, based on a determination that the motion sensor 224 continuously outputs the detection result indicating presence of the user even after the operation AC1 is input, the control unit 302 determines that the user UR who has input the operation AC1 still stays nearby, and determines to continue the invalid state ST.

At the timing when the detection result indicates no presence of the user, at the electronic whiteboard 2, the control unit 302 determines that the user UR who has input the operation AC1 has left and releases the invalid state ST. With this configuration, a time during when the motion sensor 224 is in the invalid state ST may be shortened. If the time during when the invalid state ST is set is shortened, the user, who may be still nearby, is able to start using the electronic whiteboard 2 immediately.

The preset time is set in advance, for example, by the user or a designer of the electronic whiteboard 2. Further, the preset time is stored in, for example, a storage device, such as a memory, included in the electronic whiteboard 2.

It is desirable that the preset time is set to be equal to or longer than an estimated time required for a person who has input the operation to shift to the power save mode, to move to a position out of a detection range of the motion sensor 224 after input of the operation. Desirably, the preset time is set to at least about 10 seconds.

If the preset time is set to less than 10 seconds, the motion sensor 224 may detect the person who has input the operation for shifting to the power save mode, as the person is still nearby. If the preset time is set to more than 10 seconds, it is possible to prevent the motion sensor 224 to detect the person who has input the operation for shifting to the power save mode again after input of the operation. It is desirable that the preset time is set so that the person who has input the operation for shifting to the power save mode has sufficient time to leave the electronic whiteboard 2.

On the other hand, it is desirable that the preset time is not too long. If the preset time is too long, the next user may not be able to use the electronic whiteboard 2 immediately. Therefore, it is desirable that the preset time is set to less than about 60 seconds.

Accordingly, it is desirable that the preset time is set to about 10 to 60 seconds. With such a preset time, it is possible to avoid unwanted detection of the person who has input the operation for shifting to the power save mode, while allowing the next user to use the electronic whiteboard immediately.

However, the optimum value of the preset time differs depending on a range in which the motion sensor can detect a person, a location where the electronic whiteboard 2 is installed, a size of a room where the electronic whiteboard 2 is provided, and the like. It is thus desirable that the preset time is set in consideration of setting of the motion sensor, an environment where the electronic whiteboard 2 is provided, etc. The preset value of about 10 to 60 seconds is therefore a value to be used in a meeting room generally used in companies, which may be set by default.

Second Embodiment

Figure 7:
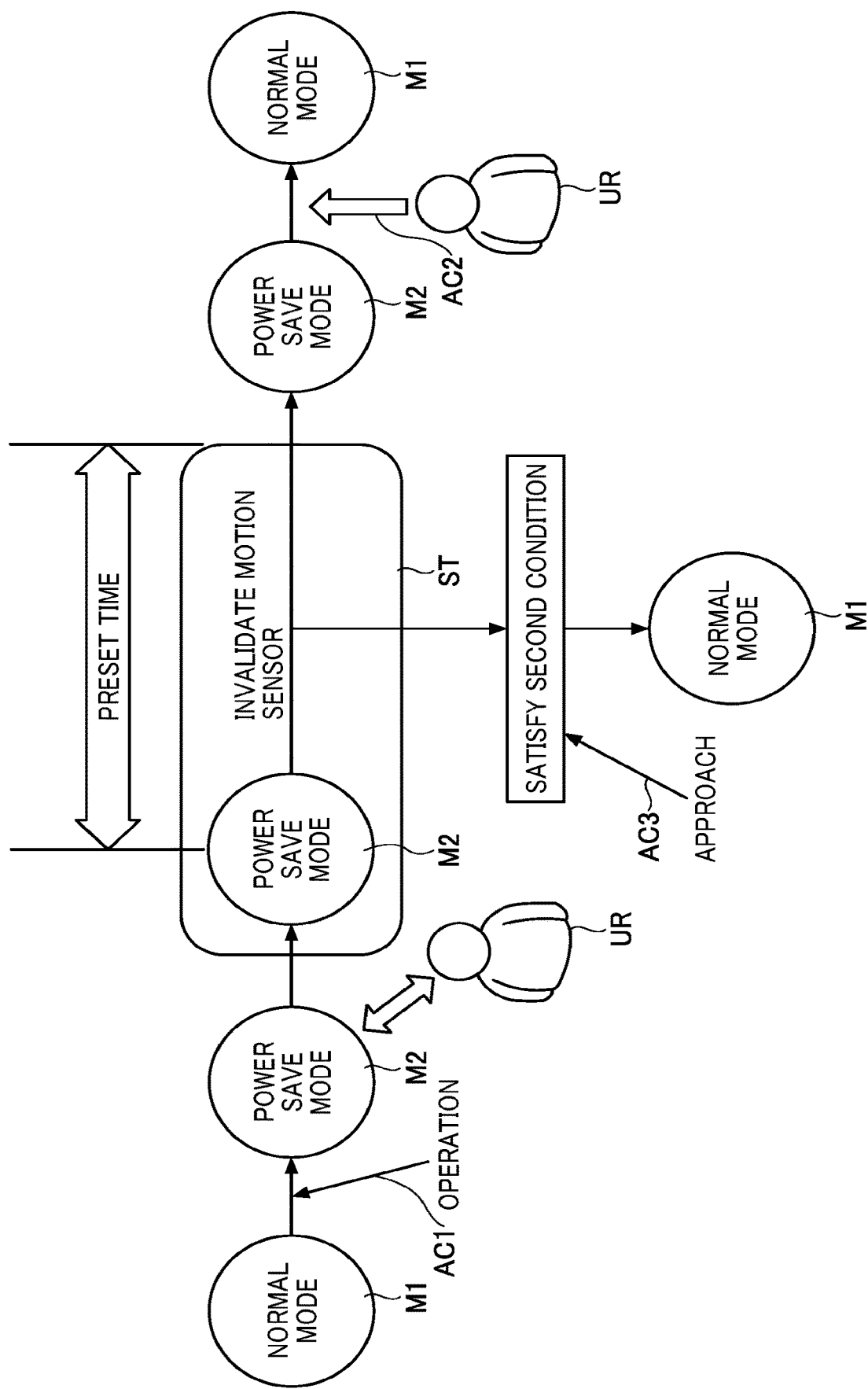
FIG. 7 is a diagram illustrating example of transition of modes, according to a second embodiment.

FIG. 7 is a diagram illustrating example of transition of modes, according to a second embodiment. Compared to the first embodiment, the second embodiment is different in that a second condition is additionally used. Hereinafter, the points different from those of the first embodiment will be mainly described, and duplicate description will be omitted.

As illustrated in FIG. 7, the deciding unit 306 releases the power save mode M2 when it is determined that the second condition is satisfied even in the invalid state ST.

For example, the second condition is set in advance to indicate that a contact to a predetermined location is detected. When the contact to the predetermined location is detected, it is determined that the second condition is satisfied.

The predetermined location is, for example, at least a part of the electronic whiteboard 2 such as the display 3. The following describes an example case in which the second condition indicates whether a contact to a predetermined location is detected, and the predetermined location is the display 3. Further, an act of the user UR touching the display 3 by hand or device is referred to as "contact act AC3".

If the second condition can be set, the user UR can cause the electronic whiteboard 2 to transition from the power save mode M2 to the normal mode M1, and use the electronic whiteboard 2 even if the elapsed time does not reach the preset value.

It is desirable that determination of whether to release the power save mode M2 based on detection of the contact act AC3 is to be forcibly made even in the invalid state ST. That is, determination of whether to transition to the normal mode M1 is made based on detection of the contact action AC3, which is set higher priority than determination of whether the elapsed time has reached the preset value (that is, the condition for determining whether to maintain the power save mode M2 in the invalid state ST).

The second condition is set to forcibly release the power save mode M2. For this reasons, decision on whether to release the power save mode M2 based on detection of the contact act AC3, is set higher priority than decision to maintain the power save mode M2, to meet intension of the user UR.

For example, there is a case where the next user UR wants to use the electronic whiteboard 2 immediately after the power save mode M2 is set by the operation AC1. In such a case, the user UR intends to immediately release the power save mode M2 and use the electronic whiteboard 2. In such situation, it is desirable to allow the user to forcibly release the power save mode M2.

Desirably, the second condition, including the predetermined location as a part of the second condition, is a condition that the user's intention to release the power save mode M2 can be clearly represented. Specifically, it is desirable to precisely detect that the user UR who wants to release the power save mode M2 is nearby. In view of this, it is desirable that the predetermined location is a location where the contact action AC3 can be detected by a sensor, which is a device included in the electronic whiteboard 2. Accordingly, it is clear that the user UR is near the electronic whiteboard 2.

Further, it is desirable that the contact action AC3 is not likely to be falsely detected as the operation AC1, which is to be performed by the user UR who intends to shift to the power save mode. In view of this, it is desirable that a device to be used in the second condition (or the predetermined location) is a device that is not used to input the operation AC1. This can prevent the control unit 302 to erroneously detect the operation AC1, input by the user UR, as the contact action AC3 that causes releasing of the power save mode M2.

Therefore, the second condition is not limited to operation to contact the display 3, or the predetermined location is not limited to the display 3, and the second condition and the predetermined location may be set in various other ways according to the above-described concerns. For example, the second condition may be set, such that the second condition is satisfied when a preset button is pressed a plurality of times.

Comparative Example

Figure 8:
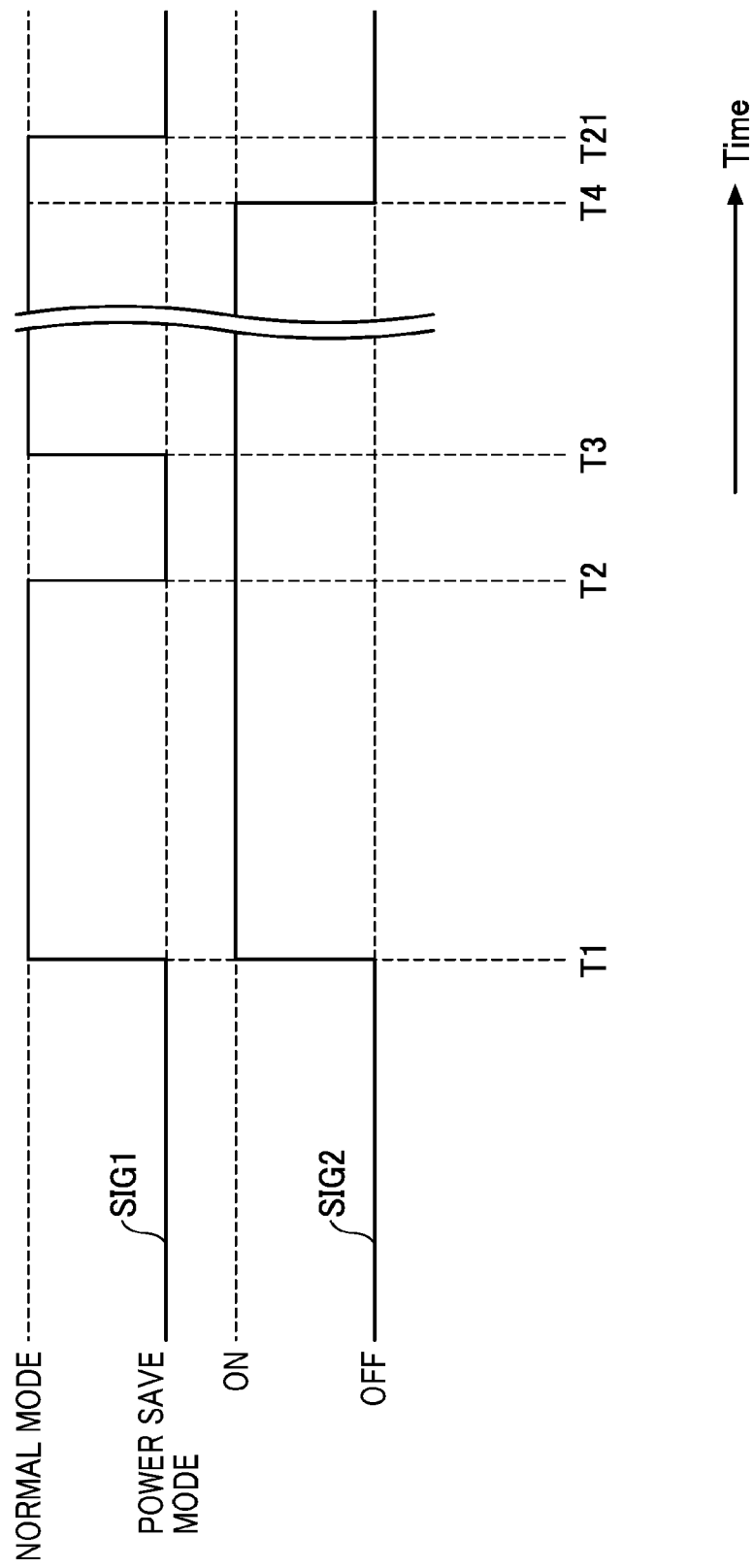
FIG. 8 is a diagram illustrating a comparative example of controlling transition to the power save mode.

FIG. 8 is a diagram illustrating a comparative example. As illustrated in FIG. 8, there is no valid signal SIG3 in the comparative example. In the comparative example, the processing result is obtained as described referring to Table 2. Hereinafter, description of the same operation or result as in the first embodiment will be omitted.

TABLE 2

| TIMING | EVENT | MODE SWITCH SIGNAL | DETECTION SIGNAL |
|---|---|---|---|
| FIRST TIMING T1 | USER ENTERS ROOM | NORMAL MODE | ON |
| SECOND TIMING T2 | USER OPERATION FOR SHIFTING TO POWER SAVE MODE | POWER SAVE MODE | ON |
| THIRD TIMING T3 | DETECTS USER | NORMAL MODE | ON |
| FOURTH TIMING T4 | USER LEAVES ROOM | NORMAL MODE | OFF |
| TIMING T21 | SHIFT TO POWER SAVE MODE | POWER SAVE MODE | OFF |

Similar to the first embodiment, the electronic whiteboard is used from the first timing T1, and the operation mode is the normal mode. After finishing use of the electronic whiteboard 2, the electronic whiteboard receives user operation for shifting to the power save mode at the second time T2. In the comparative example, similar to the first embodiment, the "normal mode" is transitioned to the "power save mode" at the second timing T2 in response to the user operation However, at the second timing T2 and the third timing T3, the user, who has input the operation, is still nearby. At the third timing T3, assuming that the user who has input the operation is detected by the detection unit, the detection signal SIG2 is "ON". Therefore, at the third timing T3, the electronic whiteboard is switched from the "power save mode" to the "normal mode" based on the detection signal SIG2 "ON".

In the comparative example, unless the detection signal SIG2 is "OFF" as in the fourth timing T4, transition from the "normal mode" to the "power save mode" is not made as in timing T21, which is timing after the timing T4.

Variation of the First Condition:

The first condition is not limited to a condition of determining whether or not a counter value of the elapsed time has reached the preset value. For example, the second determination unit may determine that the first condition is satisfied, when it is determined that the user who has input the operation for shifting the power save mode is no longer detected after input of such operation, based on a motion sensor, a sensor other than the motion sensor, or a combination thereof.

In addition to detection of presence of the user, the user who has input the operation for shifting to the power save mode can be identified, using face recognition technique, for example. If a user is detected, who is different from the user recognized when the operation is input, the second determination unit may determine that the first condition is satisfied.

The user who has input the operation is a person who has finished using the electronic whiteboard, while the user who is different from such user who has input the operation is presumed to be a person who will use the electronic whiteboard next. That is, unless the different user is detected, the user who has input the operation for shifting to the power save mode may still be in the room, for example, to clean up the room, etc. Therefore, it may not be desirable to release the power save mode just based on whether the sufficient time has elapsed. In view of this, the first condition may be set as a condition of determining a different user is present based on recognition of the user.

Any other user recognition technique may be used, such as a user recognition technique based on identification (ID) of the user, which may be input by the user or provided from an ID card of the user.

Further, the electronic whiteboard may detect a user approaching the electronic whiteboard or a user moving away from the electronic whiteboard, using a sensor that measures a distance to the object. For example, the second determination unit obtains a result of the sensor that measures a distance to the user. The second determination unit determines that the first condition is satisfied, when there is a user approaching the electronic whiteboard. That is, the second determination unit determines that a user who goes away is a user who has finished using the electronic whiteboard. In an environment where such user is present, the motion sensor is likely to detect the user who has finished using the electronic whiteboard. On the other hand, an approaching user is likely to be a user who will use the electronic whiteboard from now on. Therefore, in an environment where such user is present, the power save mode is released according to detection of the user. Accordingly, the user who intends to use the electronic whiteboard can immediately start using the electronic whiteboard.

Other Embodiments

The power supply device may be applied to an apparatus other than the electronic whiteboard. That is, the power supply device may be applied to any apparatus that transitions from the normal mode to the power save mode, according to user operation. For example, the power supply device may be applied to a video conferencing system or an image forming apparatus, each of which may be an example of an information processing apparatus, or an electric apparatus such as a lighting device.

Examples of the operation mode are not limited to the normal mode and the power save mode. The apparatus incorporating, or operating in cooperation with, the power supply device may operate in various modes, as long as the power save mode can be set. Further, a name of the mode may be other than the normal mode or the power save mode. For example, the power save mode may be a mode that consumes less power than the mode in which the apparatus is used, such that the power save mode may be called "standby mode". For the descriptive purposes, the power save mode or the standby mode in which electric power supply is reduced is called a second mode, as compared to the normal mode that can be referred to as a first mode.

Further, any one of devices in the power supply device, or the electronic whiteboard, does not have to be a single hardware device. That is, any device may be a combination of a plurality of devices. Further, the power supply device may include one or more devices other than those illustrated in FIG. 2.

In this disclosure, all or part of processing illustrated in FIG. 4 may be performed by a computer, such as the CPU 201, according to a program that is stored in any memory such as the ROM 202. That is, the program is a computer program for causing a computer, such as a CPU, which may be incorporated in any one of the power supply device, electronic whiteboard, and a power supply system, to execute a method for controlling power supply through controlling transition of an operation mode. Therefore, in execution of the program for controlling power supply, the computer having functions of calculating and controlling, performs calculations and control according to the program to carry out a method for controlling power supply. Further, a storage device, such as a memory, provided for the computer stores various data used for processing according to the program.

The above-described program can be recorded on a computer-readable recording medium for distribution. Examples of the recording medium include a magnetic tape, a flash memory, an optical disc, a magneto-optical disk, and a magnetic disk. The program can be distributed over any desired network such as a telecommunication line.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above. For example, in FIG. 4, S7 may not be performed. In such case, even when the person has been detected, the elapsed time is not reset. Even though the elapsed time is not reset, as long as the elapsed time has not reached the preset value, the operation mode is not transitioned to the normal mode. Similarly, in FIG. 4, S5 may not be performed, as it is likely that the operation mode is transitioned to the power save mode.

S5 and S7 may not be performed, especially when the additional step of determining whether the second condition is satisfied is to be performed in the second embodiment.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A power supply device comprising:
    a power supply configured to supply electric power to an information processing apparatus; and
    circuitry configured to control transition of an operation mode of the information processing apparatus from a normal power mode to a power save mode in response to reception of user operation for transitioning to the power save mode, the power save mode being a mode in which electric power supplied to the information processing apparatus is less than that of the normal power mode,
    the circuitry being further configured to:
    determine whether to release the power save mode based on a detection result of a sensor that detects presence of a human, to output a first determination result;
    determine whether a first condition relating to the user operation is satisfied, to output a second determination result;
    determine, based on the second determination result indicating that the first condition is satisfied, whether to allow releasing of the power save mode based on the first determination result indicating that no human is detected;
    determine whether a second condition is satisfied, and based on a determination that the second condition is satisfied and based on the first determination result indicating that no human is detected, allow releasing of the power save mode; and
    based on the determination that the second condition is satisfied, the circuitry is configured to prohibit the information processing apparatus from transitioning to the power save mode, irrespective of the first determination result indicating that no human is detected and the second determination result indicating that the first condition is satisfied.

2. The power supply device of claim 1, wherein the circuitry determines that the first condition is satisfied when an elapsed time, counted from the time when the operation mode is transitioned to the power save mode, reaches a preset value.

3. The power supply device of claim 2, wherein the preset value is between 10 to 60 seconds.

4. The power supply device of claim 1, wherein the circuitry determines that the second condition is satisfied when contact to a predetermined area of the information processing apparatus is detected.

5. The power supply device of claim 4, wherein the predetermined area is different from an area for receiving the user operation for transitioning to the power save mode.

6. A power supply system comprising:
    the power supply device of claim 1; and
    the sensor configured to detect presence of the human.

7. The power supply system of claim 6, wherein the power supply system is an electronic whiteboard,
    wherein the circuitry is mounted on a control board removable from the electronic whiteboard.

8. A power supply system comprising:
    the power supply device of claim 4; and
    the sensor configured to detect presence of the human,
    wherein the power supply system is an electronic whiteboard, and the predetermined area is a display of the whiteboard.

9. A power supply system comprising:
    circuitry configured to:
    control transition of an operation mode of an information processing apparatus from a normal power mode to a power save mode in response to reception of user operation for transitioning to the power save mode, the power save mode being a mode in which electric power supplied to the information processing apparatus is less than that of the normal power mode;
    determine whether to release the power save mode based on a detection result of a sensor that detects presence of a human, to output a first determination result;
    determine whether a first condition relating to the user operation is satisfied, to output a second determination result;
    determine, based on the second determination result indicating that the first condition is satisfied, whether to allow releasing of the power save mode based on the first determination result indicating that no human is detected;
    determine whether a second condition is satisfied, and based on a determination that the second condition is satisfied and based on the first determination result indicating that no human is detected, allow releasing of the power save mode; and
    based on the determination that the second condition is satisfied, the circuitry is configured to prohibit the information processing apparatus from transitioning to the power save mode, irrespective of the first determination result indicating that no human is detected and the second determination result indicating that the first condition is satisfied.

10. The power supply system of claim 9, further comprising:
- a power supply device configured to supply electric power to an electronic whiteboard; and
- the sensor configured to detect presence of the human.

11. A method for controlling power supply to an information processing apparatus, the method comprising:
- controlling the information processing apparatus to transition from a normal power mode to a power save mode, in response to reception of user operation for transitioning to the power save mode, the power save mode being a mode in which electric power supplied to the information processing apparatus is less than that of the normal power mode;
- determining whether to release the power save mode based on a detection result of a sensor that detects presence of a human, to output a first determination result;
- determining whether a first condition relating to the user operation is satisfied, to output a second determination result;
- determining, based on the second determination result indicating that the first condition is satisfied, whether to allow releasing of the power save mode based on the first determination result indicating that no human is detected;
- determining whether a second condition is satisfied, and based on a determination that the second condition is satisfied and based on the first determination result indicating that no human is detected, allow releasing of the power save mode; and
- based on the determination that the second condition is satisfied, prohibiting the information processing apparatus from transitioning to the power save mode, irrespective of the first determination result indicating that no human is detected and the second determination result indicating that the first condition is satisfied.

12. The method of claim 11, wherein the determining determines that the first condition is satisfied, when an elapsed time, counted from the time when an operation mode is transitioned to the power save mode, reaches a preset value.

13. The method of claim 11, further comprising, wherein the determining determines that the second condition is satisfied, when contact to a predetermined area of the information processing apparatus is detected.

* * * * *